(12) United States Patent
Hungerbuehler et al.

(10) Patent No.: US 6,297,760 B1
(45) Date of Patent: Oct. 2, 2001

(54) DATA ACQUISITION SYSTEM COMPRISING REAL-TIME ANALYSIS AND STORING MEANS

(75) Inventors: Viktor M. Hungerbuehler, Satigny; Bernard Mauron, Chambesy, both of (CH)

(73) Assignee: Acqiris, Plan-les-Ouates (CH)

( * ) Notice: Subject to any disclaimer, the term of this patent is extended or adjusted under 35 U.S.C. 154(b) by 0 days.

(21) Appl. No.: 09/712,097

(22) Filed: Nov. 14, 2000

Related U.S. Application Data

(63) Continuation of application No. PCT/CH99/00153, filed on Apr. 16, 1999.

(30) Foreign Application Priority Data

May 18, 1998 (EP) .................................................. 98810452

(51) Int. Cl.$^7$ ........................................................ H03M 1/12
(52) U.S. Cl. .............................................. 341/155; 341/161
(58) Field of Search ................................. 341/155, 161, 341/159, 160, 158

(56) References Cited

U.S. PATENT DOCUMENTS 4,654,632   3/1987   Yoshida et al. .
6,166,673 * 12/2000   Odom ................................. 341/155

FOREIGN PATENT DOCUMENTS 0 375 246 A2   6/1990   (EP) .
0 629 966 A1   12/1994   (EP) .

OTHER PUBLICATIONS

Georg Huba, "High–Speed Data Acquisition with SDA 8020 by Data Splitting", *Siemens Components XXIV*, Dec. 1989, pp. 233–235.

* cited by examiner

*Primary Examiner*—Brian Young
(74) *Attorney, Agent, or Firm*—Pearne & Gordon LLP

(57) ABSTRACT

The circuit for converting a high-frequency analog input signal (a) into a plurality of digital signals ($D_1$–$D_N$) for processing by a digital processor (8) in a data acquisition system comprises: an analog-to-digital m-bits converter (1), a memory (5) for storing the digital data ($d_1$–$d_N$) converted by said converter, said memory being accessible by said digital processor (8), a circuit (6) for analyzing in real time said digital data ($D_1$–$D_N$), capable of modifying the storage address of said digital data ($D_1$–$D_N$) in said memory (5) following the detection of a predefined event in said digital data ($D_1$–$D_N$).

20 Claims, 2 Drawing Sheets

DATA ACQUISITION SYSTEM COMPRISING REAL-TIME ANALYSIS AND STORING MEANS

Figure 1:
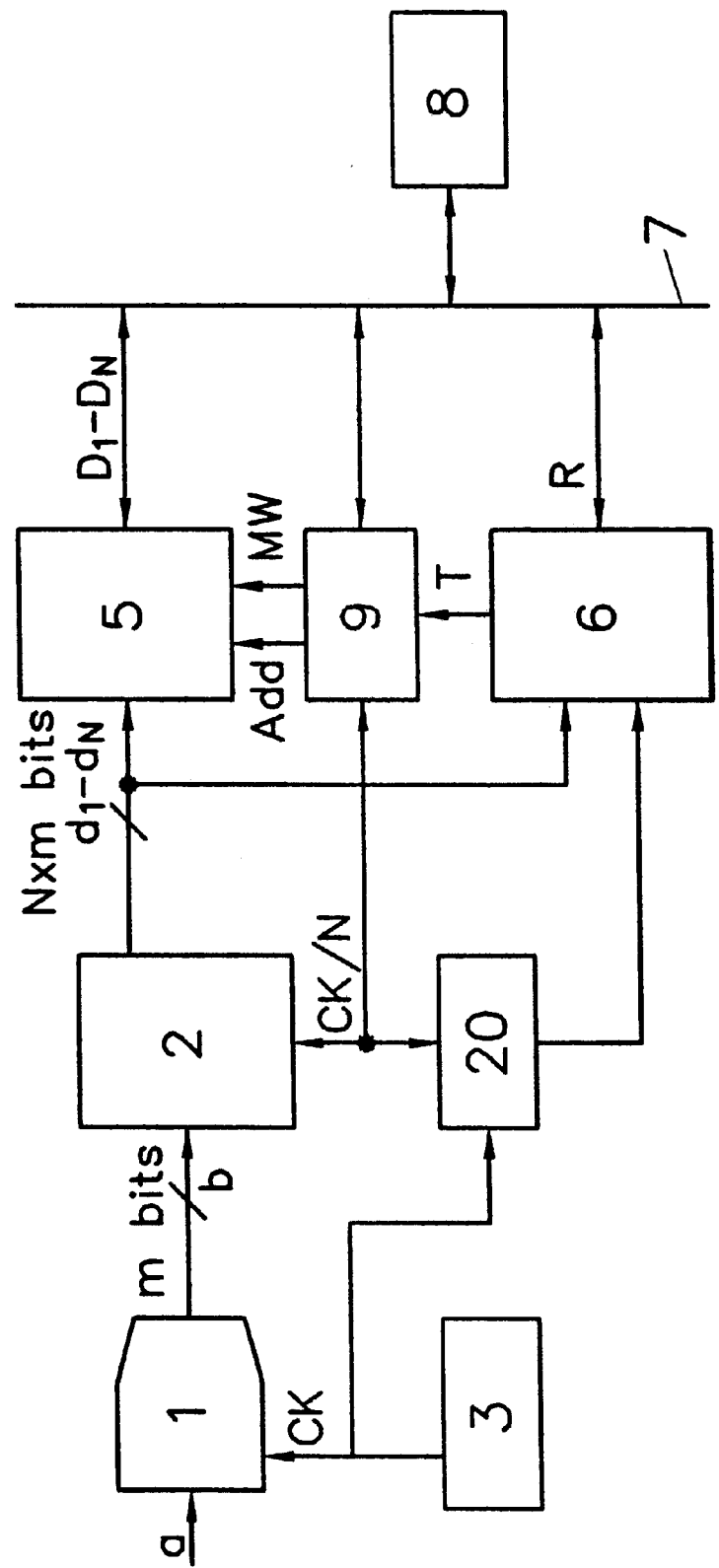

This application is a continuation based on international application PCT/CH99/00153 (WO99/60495), filed on Apr. 16, 1999, and claiming priority of the unpublished application EP98810452.7 of May 18, 1998, whose contents are hereby incorporated by way of reference.

The international applications PCT/CH98/00377 (WO99/60494) and PCT/CH99/00154 (WO99/60496), whose contents are hereby incorporated by way of reference, claim the priority of the same application EP98810452.7.

1. Field of the Invention

The present invention concerns a data acquisition system comprising a circuit for converting an analog input signal into a plurality of digital signals, according to the preamble of claim 1. The present invention concerns in particular a data acquisition system comprising a conversion circuit supplying digital signals for processing by a digital processor in a data acquisition system.

2. Related Art

Many types of data acquisition systems are known, for example transitory recorders and digital oscilloscopes, in which it is necessary to convert one or several analog signals into one or several digital signals capable of being stored in a digital memory and processed by a digital processor. These systems comprise generally an input stage constituted of one or several digitizers and of a memory for digitized data; the processor accesses said memory most often through a bus. In low-frequency systems, this memory can for example be constituted directly by the RAM of a computer. The digitized data are stored in this memory and processed, for example displayed, by the processor of this computer either in real time or later, for example when all the data have been acquired.

More and more often in electronic technology, very high frequency analog signals requiring very fast acquisition systems, for example oscilloscopes, are used. Digitizers are currently made that work with a sampling frequency greater than 500 MHz, for example on the order of 1 GHz or more; it is to be predicted that these current limits will be exceeded with the appearance of better performing components. These digitizers enable by virtue of the Nyquist principle to supply an unambiguous digital representation of analog signals having a maximum frequency of several hundred MHz.

These ultra-fast digitizers supply a digital word, for example an octet in the case of eight bit converters, at each flank of the sample signal, for example each nanosecond; the digital output frequency generated is thus extremely high, and generally incompatible with the maximum write access frequency of the usual memory circuits. One thus knows the utilization of demultiplexers, which make it possible in a data acquisition system to supply in parallel N words delivered in series by a digitizer. The output frequency of the demultiplexer is divided by N, at a price of an increase by this same factor of the width of the data bus. The demultiplexer thus allows a stream of words of m bits to be converted into another stream of words of N×m bits of output rate N times weaker, and thus compatible with the writing speeds of available memory components.

In many situations, interest will be directed more particularly to certain specific events in a continuous or very long data stream. For example, one often wishes to acquire a temporal window of limited size around a particular event of the analyzed signal, for example around a zero crossover. When the stream of data to be analyzed is continuous, or very long, it is not possible to store it entirely in a memory at an acceptable cost. The size of the available memory in a conventional system thus generally imposes a compromise between the sampling frequency and the length of acquisition of the signal. If the acquisition window memorized is too short, however, there is a risk that it does not to contain the most important times of the signal, notably the samples just before and just after the occurrence of a particular event of the signal.

Document U.S. Pat. No. 5,397,981 describes a circuit for converting an analog input signal into digital signals. The circuit comprises a circuit for analyzing the analog data that permits the acquisition to be interrupted upon detecting a predefined event in the stream of analog data.

The article by Huba G: *"High-Speed Data Acquisition with SDA 8020 by Data Splitting"*, vol. 24, N° 6, Dec. $1^{st}$, 1989, pages 233–235, ISSN:0945-1137, describes an ECL-TTL conversion circuit provided with a counter defining the writing address in a CMOS memory. This document does not however concern the analog-to-digital conversion and does not suggest to modify the writing address according to the ECL data entered.

A purpose of the invention is to remedy the mentioned inconveniences, and to extend the possibility of real-time processing and analysis of high-frequency digital data in a data acquisition system.

Another purpose is to supply a system enabling digital samples to be acquired in a temporal window linked temporally with a predefined event in this signal, and thus to memorize mainly the most important portions of the signal.

BRIEF SUMMARY OF THE INVENTION

According to the invention, these purposes are achieved by means of a data acquisition system comprising the elements of claim 1, different embodiments being further indicated in the dependent claims.

In particular, these purposes are achieved with a data acquisition system in which, upon detection of a particular event in a stream of digital data by means of a real-time analysis circuit, the storage of data in the storage memory is altered, for example interrupted, so as to enable the processing or visualizing of a limited portion of the data stream.

According to the invention, these purposes are further achieved by means of a circuit for converting a high-frequency analog signal into a plurality of digital signals for processing by a digital processor in a data acquisition system, comprising an analog-to-digital converter, a storage element accessible by the processor for storing the converted digital data, and a circuit for analyzing in real time the converted digital data, able to modify the data storage address in the storage means upon detecting a particular event in the converted digital data.

In a preferred embodiment of the invention, the analysis circuit is connected at the output of a demultiplexer supplying in parallel a plurality of words of m bits supplied in series by the analog-to-digital converter.

By making or programming the analysis circuit in an appropriate manner, it is thus possible to detect in real time any event in the stream of digital data, and thus to immediately modify the storage address of these data so as to keep in memory a temporal window linked to this event.

Advantageously, the operation of the real-time analysis circuit can be defined with parameters or even completely determined or programmed by the digital processor; a great flexibility is thus achieved, and it is possible to effect a detection of the different events without modifying the physical configuration of the circuit.

The invention will be better understood with the aid of the description of an embodiment of the invention given as example and illustrated by the figures showing:

FIG. 1 a block diagram of a conversion circuit of a high-frequency analog input signal into a plurality of digital signals according to the invention.

Figure 2:
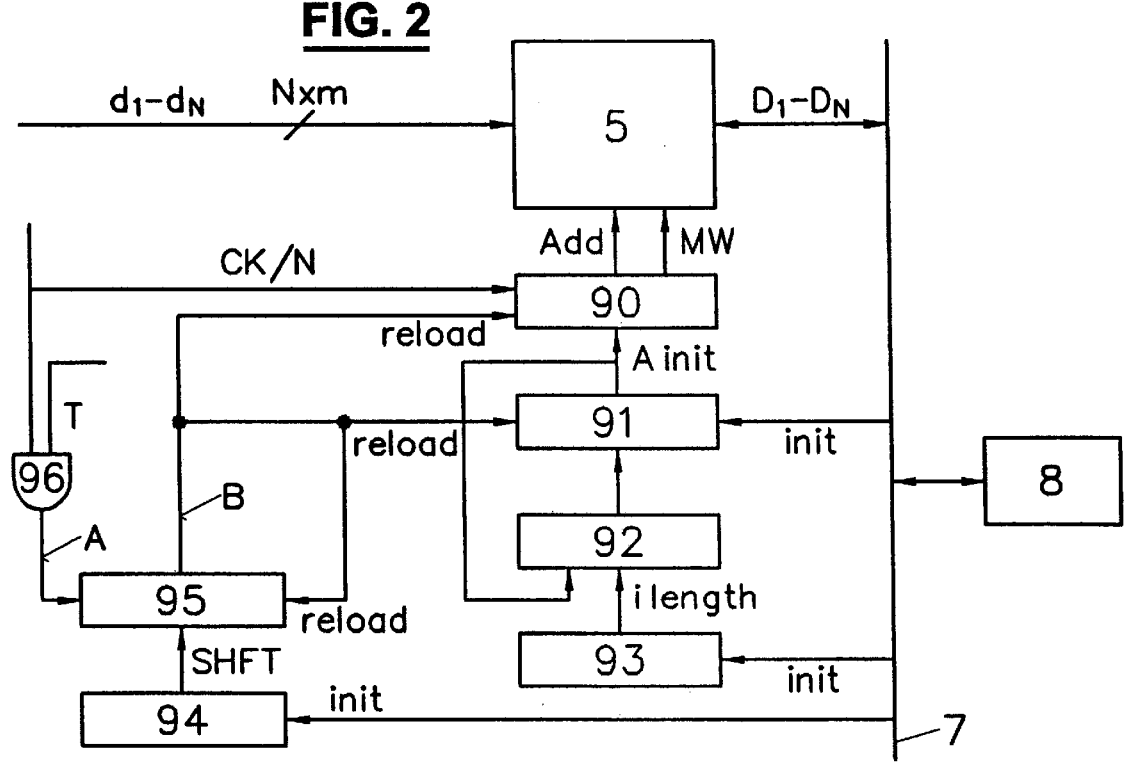

FIG. 2 a block diagram of the address controller according to the invention.

Figure 3:
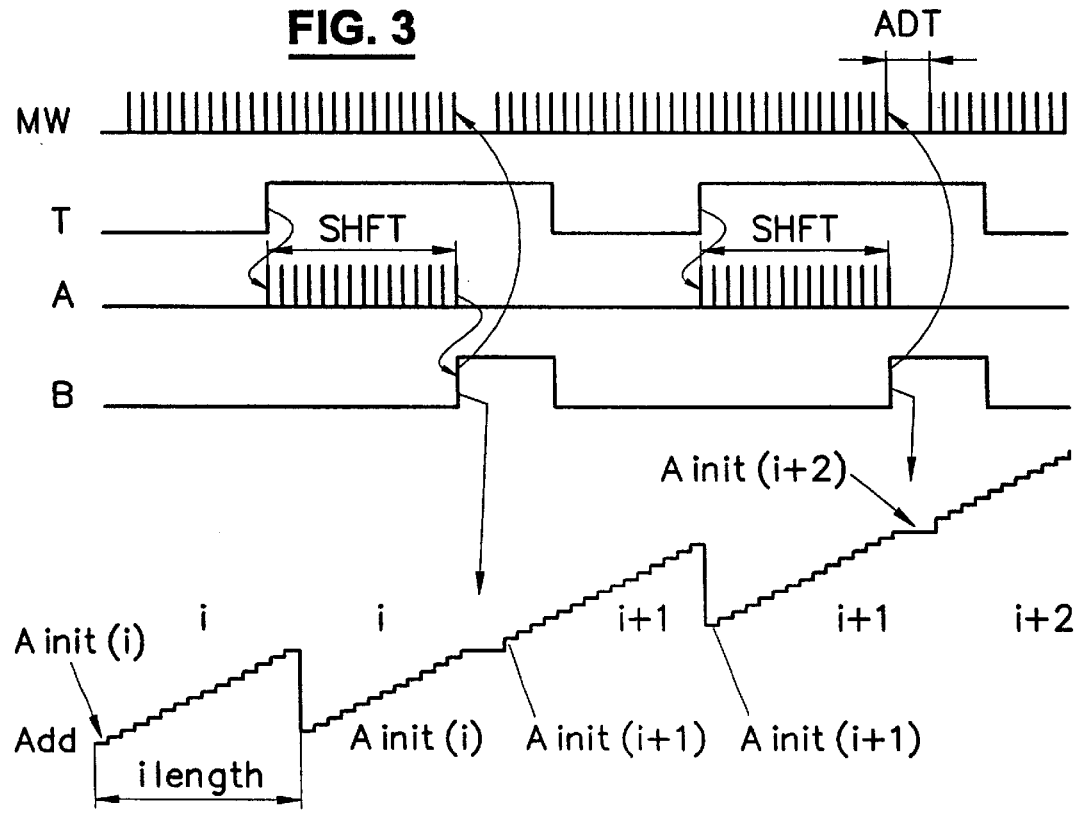

FIG. 3 a temporal diagram of the different signals generated by the circuit of the invention.

DETAILED DESCRIPTION OF THE INVENTION

Although the circuit of the invention is particularly intended to be used in an oscilloscope, notably in a high-frequency digital oscilloscope, or in a transitory recorder, the one skilled in the art will understand that this circuit can also be used in any high-frequency data acquisition system, in particular when the sampling frequency of the digitizer or digitizers is equal to, or greater than, the external bus frequency of the digital processor.

FIG. 1 illustrates a block diagram of the whole conversion circuit according to the invention. This circuit is intended for use in a data acquisition system of a known type. At least one analog signal a to be analyzed is converted into a digital signal b by at least one digitizer 1 of known type. The digitizer 1 comprises preferably a sample-and-hold stage and an analog-to-digital converter mounted in series. The digitizer 1 supplies at each sampling time, determined by a clock signal CK supplied by the clock generator 3, a sampled value corresponding to the instant value of the analog signal a. In order for this analog signal a to be represented unambiguously by the digital signal b, the digitizer 1 must use a sampling frequency at least equal to the Nyquist frequency, i.e. a frequency at least equal to the double of the maximum frequency of the analog signal. If the circuit is intended to analyze signals of several hundreds of MHz, one will thus preferably choose a sampling frequency greater than 500 MHz, preferably greater than 1 GHz. In an embodiment not represented, it is also possible to use in the framework of this invention several digitizers supplying interlaced digital samples, in order to increase the possible sampling frequency with a given type of digitizer.

The resolution of the digitizer 1 depends on the needs of the specific application; in many high-frequency applications, a digitizer with a relatively low resolution, supplying sampled values coded for example with a number of bits m of 8, 10 or 12, is sufficient, the invention being however not limited to these values of m.

The digitizer 1 supplies at each sampling time a word of m bits, for example 8 bits every nanosecond. The corresponding frequency is greater than the maximum writing frequency of the usual RAMs, so that in order to store these data in a RAM 5, it is generally necessary to demultiplex them by means of at least one demultiplexer 2 of a known type enabling the output rate of the digital signal b to be divided by a factor N, for example by 4, the invention being however not limited to this particular value of N nor even to the presence of a demultiplexer. These demultiplexed data are stored in at least one RAM 5, the storing address to being determined by an address controller 9 described further below. A digital processing system, comprising at least one digital processor 8, then accesses the stored data $D_1$–$D_N$, preferably through a bus 7, and according to the algorithm executed effects different operations of processing, analyzing, storing and/or displaying these data on a display not represented.

The RAM 5 can be constituted of any type of dynamic or preferably static memory, comprising one or several discrete modules arranged according to any appropriate schema. In a preferred embodiment of the invention, the memory 5 is a double access memory enabling the digital processing system 8 to access the data stored while the demultiplexer 2 writes new data. Preferably, the digital processing system 8 can further access the address counter 9 to modify the address at which the demultiplexed data are written or to modify the organization of this memory by organizing for example one or several segments within this memory.

According to the invention, the conversion circuit comprises at least a digital real-time analysis circuit 6 able to analyze in real time the digital data b supplied by the analog-to-digital converter 1. The data are analyzed in parallel to their storage in the memory 5. In the illustrated preferred embodiment, the analysis circuit 6 is connected to the output of the demultiplexer 2 and thus receives the digital data whose output rate is divided by N in relation to the data b at the output of the converter 1. The analysis circuit 6 could however also be connected directly at the output of the converter 1, in the case of a circuit sufficiently fast in respect of the data acquired by the system.

The digital circuit 6 is synchronized by the signals supplied by the clock generator 20. It supplies at its output a trigger signal (trigger) controlling the address controller 9 when a determined event is detected in the data stream. In a preferred embodiment of the invention, as will be seen further below, the digital circuit 6 further supplies a result signal R to the digital processing system 8.

The trigger signal T can for example be supplied by the circuit 6 as soon as the latter detects an error or a particular condition in the digital signal b. It is also possible in the framework of this invention to make analysis circuits supplying a trigger signal T when any event among a plurality of predefined events occurs or when several distinct conditions are fulfilled. In the same manner, it is possible to make an analysis circuit reacting to distinct events by supplying distinct trigger signals $T_O$–$T_L$ that can cause a different behavior of the address controller 9. It is furthermore also possible in the framework of this invention to provide several analysis circuits 6 connected in parallel and effecting different processing operations on the digital data b, so as to detect different events in these data.

FIG. 2 illustrates in more detail the address controller 9 according to a preferred embodiment of the invention, whereas FIG. 3 illustrates as an example several signals in this controller 9. The corresponding elements in the various figures are designated with the same reference numbers; the components of the address controller 9 in FIG. 1 being indicated by a number beginning by 9 in FIG. 2.

The address controller 9 comprises principally an address counter 90 incremented by a signal whose frequency corresponds preferably to the sampling frequency CK/N of the signals at the output of the demultiplexer 2. The address counter 90 supplies at its output a signal MW (Memory Write) whose frequency corresponds to that of the signal CK/N as well as an address Add whose value is incremented by an addressing position at each impulse of the signal MW. The digital data $d_1$–$d_N$ supplied by the demultiplexer 2 are stored at each impulse of MW in the memory 5 at the new address indicated by the signal Add.

The address counter 90 is cyclical; after having counted a predetermined number of impulses, indicated in a segment depth register 93, the address Add at the output of the counter 90 returns to the initial counting value indicated in an initial address register 91. The stream of digitized data is thus stored in a segment i of the memory 5 whose length $i_{LENGTH}$ is determined by the register 93 and whose initial position $A_{INIT}(i)$ by the register 91; when the segment is full, in the absence of any event detected by the circuit 6, the new data overwrite those written previously in the same segment i. The registers 90 and 93 are accessible from the bus 7 and can thus be modified by the processing means 8 programmed accordingly.

The clock signal CK/N is also supplied at the input of a logical gate 96 of the type AND receiving at its other input a trigger signal T originating from the analysis circuit 6 of FIG. 1. The signal A at the output of the logical gate 96 is used to increment a post-trigger counter 95, enabling a temporal shift of the analysis window to be indicated. The counter 95 is thus incremented at each impulse of the clock signal CK/N as soon as the signal T receives the value 1, i.e. as soon as the analysis circuit 6 has detected a particular condition on the analyzed digital signal.

After having counted a predetermined number SHFT of impulses, indicated by a shift register 94 accessible through the bus 7 and by the processing means 8, the output B of the counter changes its state, as indicated on the fourth line of FIG. 3. The position $A_{INIT}$ of the writing segment in the memory 5 is then shifted by a segment, by means of an adder 92 supplying at the re-initialization input of the register 91 a value obtained by adding the preceding value $A_{INIT}(i)$ of the register 91 and the value $i_{LENGTH}$ indicated by the segment depth register 93. The address counter 90 is then re-initialized with the new segment initial position value indicated by the register 91. The writing signal MW in the memory 5 is preferably interrupted by the counter 90 during the interval ADT (Acquisition Dead Time) during which the registers and counters are re-initialized. The counter 95 is itself re-initialized to zero during the interval ADT.

As can be seen more specifically on the last line of FIG. 3 indicating the value Add at the output of the address counter 90, the digital data $d_1-d_N$ are stored cyclically in the same segment whose initial address is indicated by the register 91 until an event detected by the circuit 6 and indicated by the trigger signal T occurs. When an event has been detected, the digital data continue to be written in this segment for a predetermined lapse of time. When this period of time has elapsed, the writing address is modified so that the following data are written in another segment of the memory 5, typically in a neighboring segment, whose initial address is indicated by the register 95. The processing circuit 8 can thus retrieve in various segments of the memory 5 different portions of the digital signal b, corresponding to different observation windows linked to different occurrences of the event observed.

The one skilled in the art will understand that other arrangements of the memory and other ways of modifying the addressing of the memory following the occurrence of an event in the stream of data can be conceived. In particular, if different events are detected by the analysis circuit 6, it is possible to store, in various memory segments i, signal portions linked to each type of event. It is also possible for example to provide segment lengths $i_{LENGTH}$ of different size according to the type of event observed.

The digital analysis circuit 6 can be made in any adapted manner according to the type of events to be observed. As an example, in a flexible yet expensive embodiment, each of the N words of m bits delivered by the demultiplexer 2 can be treated by an autonomous analysis system, for example by one or several digital signal processors (DSP), by a polyvalent processor, by any digital component or by a specific integrated circuit (ASIC). Each autonomous analysis system processes a word without taking into account the analyses effected by the other systems. According to the application, it is also possible to connect the different processing systems in a network. A trigger signal T can, according to the application, be provoked either by any analysis system, or when the signals at the output of all the systems fulfill a predefined condition.

The analysis systems execute preferably a program stored in a RAM or ROM whose contents can be modified by the digital processing system 8, through the bus 7. In this manner, the program executed by the digital system 8 can modify the analysis effected by the analysis systems and thus adapt the conditions for triggering the signal T according to the needs of the application.

In another preferred embodiment, the analysis circuit 6 calls upon a network of gates, a structure generally designated by the term gate array. Preferably, the circuit 6 is constituted of a structure of gate arrays that can be programmed by the user, known under the name of FPGA (field programmable gate array). Numerous examples of circuits comprising such a structure are for example described in patent documents classified notably in the group HO2K-19/177 of the international patent classification; these circuits will therefore not be described in further detail.

Preferably, the analysis circuit 6 is of the type SRAM-FPGA. This component then executes a processing operation determined by an algorithm stored in a static RAM (SRAM), not represented, whose contents make it possible to reprogram the circuit 6. In a preferred embodiment of the invention, the digital processing system 8 can access in writing the contents of said SRAM through the bus 7, so as to modify the analysis effected by the circuit 6 according to the needs of the application.

The one skilled in the art will understand that other embodiments of the circuit 6 can be conceived in the framework of this invention.

In a preferred embodiment of the invention, described more specifically in patent application PCT/CH98/00377 in the applicant's name, the digital analysis circuit 6 supplies also a processed digital result R to the digital processing system 8. The digital result R can include, according to the application and the processing effected, for example a single bit, for example a bit of error detection or of detection of a particular situation in the digital data, for example a zero or maximum detection bit. This bit can for example be supplied on a data line of the bus 7, or in a variant embodiment also be directly connected to a material interruption line of the digital processor 8 or of another component of the digital system. In a variant embodiment, the analysis circuit 6 can also supply a result R over more than one bit, for example over one or several octets, accessible at a predetermined address on the bus 7. The result R can for example include data of semi-static type and indicate for example a semi-permanent state of the digital data.

It is also possible in the framework of this invention to provide several analysis circuits 6 connected in parallel, effecting different processing operations on the demultiplexed data and supplying different results R1, R2 etc. at different addresses on the bus 7. For example, it is possible to provide a circuit effecting a detection of extrema, a second circuit effecting a detection of zero crossover, a third circuit effecting an error detection etc.

The digital analysis circuit 6 comprises preferably a memory zone or a register zone, not represented, in which the result of the processing is stored. This memory zone can be accessed by the digital processing system 8 at a predetermined address.

The digital processing system 8 can, according to the executed program, access either the data $D_1$ _ $D_N$ stored in the memory 5 or the results R delivered by the circuit 6 or both simultaneously. It accesses the results R of the digital analysis circuit 6 preferably through the data lines of the bus 7 or, as mentioned, through interruption lines. For example, in the case when the circuit 6 effects an error detection or a detection of a specific event on the input signal, it is possible to modify by means of an interruption signal the running of the program executed by the digital processor 8 when an error or a particular configuration is indeed detected. The interruption signal R can possibly be generated even before the digital system accesses the corresponding data in the memory 5, and it is thus possible to modify the processing or displaying of these data when such an event is detected.

What is claimed is:

1. Circuit for converting a high-frequency analog input signal into a plurality of digital signals for processing by a digital processor in a data acquisition system, comprising:

an analog-to-digital m-bits converter, a memory for storing the digital data converted by said converter, said memory being accessible by said digital processor, a circuit for analyzing in real time said digital data, intended to provoke a modification of the storage address of said digital data in said memory upon a predefined event being detected in said digital data.

2. Circuit according to the preceding claim, further comprising a demultiplexer for demultiplexing the digital data supplied by said analog-to-digital converter and for supplying in parallel to said memory and to said analysis circuit N words of m bits demultiplexed from N words of m bits supplied in series by said analog-to-digital converter.

3. Circuit according to claim 1, further comprising an address counter defining an address at which said digital data are to be stored in said memory, the functioning of said address counter being controlled by said real-time analysis circuit.

4. Circuit according to the preceding claim, wherein the functioning of said address counter is controlled by said digital processor.

5. Circuit according to claim 3, wherein the functioning of said address counter is controlled by a plurality of registers of which at least several are accessible in writing by said digital processor and/or by said analysis circuit.

6. Circuit according to claim 3, wherein data segments in the same segment of said memory, then in another segment following the occurrence of a said predefined event.

7. Circuit according to the preceding claim, wherein the length of said segments is controlled by said digital processor and/or by said analysis circuit.

8. Circuit according to the preceding claim, wherein, following the occurrence of a said predefined event, the value of said counter is incremented by a value stored in a register accessible in writing by said digital processor and/or by said analysis circuit.

9. Circuit according to claim 6, wherein the initial position of said segments is indicated in a register accessible by said digital processor and/or by said analysis circuit.

10. Circuit according to claim 5, wherein a register accessible by said digital processor and/or by said analysis circuit indicating from which time onwards said storage address must be modified by said analysis circuit following the occurrence of a said specific configuration.

11. Circuit according to the preceding claim, wherein said analysis circuit further supplies processed results to said digital processor.

12. Circuit according to claim 1, wherein the sampling frequency of the analog-to-digital converter is greater than the processing rate of the digital processor.

13. Circuit according to claim 1, wherein said real-time analysis circuit comprises N analysis systems in parallel.

14. Circuit according to the preceding claim, wherein each analysis system comprises a signal processor.

15. Circuit according to claim 1, wherein said real-time analysis circuit comprises one or several gate arrays.

16. Circuit according to the preceding claim, wherein said real-time analysis circuit comprises one or several field programmable gate arrays.

17. Circuit according to the preceding claim, wherein said real-time analysis circuit comprises one or several field programmable gate arrays whose algorithm is contained in a RAM.

18. Circuit according to the preceding claim, wherein said RAM is accessible in reading and/or writing by said digital processor.

19. Circuit according to claim 1, wherein said memory comprises a double access memory accessible simultaneously by said digital processor (8) and by said demultiplexer or by said converter.

20. Oscilloscope comprising a circuit according to claim 1.

* * * * *